United States Patent
Lombrozo et al.

(10) Patent No.: US 10,641,877 B2
(45) Date of Patent: *May 5, 2020

(54) LIDAR SENSOR WINDOW CONFIGURATION FOR IMPROVED DATA INTEGRITY

(71) Applicant: Waymo LLC, Mountain View, CA (US)

(72) Inventors: Peter Craig Lombrozo, Scotts Valley, CA (US); Felix Jose Alvarez Rivera, Tarzana, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,636

(22) Filed: Nov. 9, 2018

(65) Prior Publication Data

US 2019/0178997 A1    Jun. 13, 2019

Related U.S. Application Data

(63) Continuation of application No. 15/417,654, filed on Jan. 27, 2017, now Pat. No. 10,168,423.

(51) Int. Cl.
*G01C 22/00* (2006.01)
*G05D 1/00* (2006.01)
(Continued)

(52) U.S. Cl.
CPC .............. *G01S 7/497* (2013.01); *G01S 7/4811* (2013.01); *G01S 7/4813* (2013.01);
(Continued)

(58) Field of Classification Search
CPC ...... G01S 7/497; G01S 7/4813; G01S 17/936; G01S 2007/4975; G01N 21/3577;
(Continued)

(56) References Cited

U.S. PATENT DOCUMENTS 7,059,522 B2 * 6/2006 Inomata ................... G01C 3/06
                                                            235/454
7,208,723 B2 * 4/2007 Takenaga ............... B60S 1/0818
                                                            250/227.25
(Continued)

FOREIGN PATENT DOCUMENTS

JP    2014133426 A    7/2014
WO    2015140899 A1   9/2015

OTHER PUBLICATIONS

Notification of Reexamination for CN Application No. 201820144692.0 dated Jun. 27, 2019 (with English Translation) 7 pages.

*Primary Examiner* — Mahmoud S Ismail
(74) *Attorney, Agent, or Firm* — Botos Churchill IP Law

(57) ABSTRACT

The disclosure relates to determining whether an optical interferent is located on a sensor window and providing a way to identify and discard erroneous sensor data. An example system includes a housing, having a first sensor window and a second sensor window, a laser light source, and an optical sensor. The first window has a first property for deflecting water, and the second window has a second property for deflecting water different from the first property. The source is configured to generate a beam of light through the first window. One or more processors are configured to receive sensor data from the optical sensor and determine that an optical interferent is located on a surface of at least one of the first window and the sensor window based on a comparison between sensor data corresponding to the first window and sensor data corresponding to the second window.

20 Claims, 5 Drawing Sheets

(51) Int. Cl.

| | | |
|---|---|---|
| *G01S 7/497* | (2006.01) | |
| *G01S 7/481* | (2006.01) | |
| *G01S 17/931* | (2020.01) | |
| *G05D 1/02* | (2020.01) | |
| *G06T 7/00* | (2017.01) | |
| *G01N 21/25* | (2006.01) | |
| *G01N 1/10* | (2006.01) | |
| *G01C 3/08* | (2006.01) | |
| *G06K 7/10* | (2006.01) | |
| *G06K 7/14* | (2006.01) | |

(52) U.S. Cl.
CPC .............. *G01S 17/931* (2020.01); *G05D 1/024* (2013.01); *G06T 7/00* (2013.01); *G01S 2007/4975* (2013.01); *G01S 2007/4977* (2013.01)

(58) Field of Classification Search
CPC ......... G01N 21/15; B60S 1/0818; G01C 3/06; G05D 1/024
USPC ..... 701/28; 356/409, 246, 5.01; 250/277.25; 235/454
See application file for complete search history.

(56) References Cited

U.S. PATENT DOCUMENTS

| | | | |
|---|---|---|---|
| 7,495,747 B2 | 2/2009 | Yoshida et al. | |
| 2006/0152705 A1* | 7/2006 | Yoshida | G01S 7/4813 356/5.01 |
| 2013/0293881 A1* | 11/2013 | Tokhtuev | G01N 21/15 356/246 |
| 2016/0025489 A1 | 1/2016 | Klepsvik et al. | |
| 2016/0377535 A1* | 12/2016 | Gu | G01N 21/3577 356/409 |

\* cited by examiner

LIDAR SENSOR WINDOW CONFIGURATION FOR IMPROVED DATA INTEGRITY

CROSS-REFERENCE TO RELATED APPLICATIONS

This application is a continuation of U.S. patent application Ser. No. 15/417,654 filed Jan. 27, 2017, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc. As an example, these systems may include sensors, such as laser scanning equipment and cameras, mounted at various locations on the vehicle.

While such sensors come in many different configurations, as an example, a ("light detection and ranging") LIDAR sensor may include at least a laser light source, an optical sensor, and a controller. The laser light source provides a pulsed beam of light into the environment of the LIDAR sensor. Any light from the beam of light that is reflected off of an object back towards the LIDAR sensor is detected by the optical sensor. The distance from the reflecting object is determined by the controller and a record of the surface is recorded as an object in space. The sensor data from successive measurements can be used to generate a 3D map of the environment. The usefulness of such maps is dependent upon the sensor and laser having an unobstructed view through the sensor windows.

For instance, an area of the sensor window may become contaminated with dust, dirt, mud, salt, leaves, water, or other substances or debris that act as an optical interferent. In this regard, the optical interferent interferes with the path of the beam of light from the laser light source away from the sensor window and/or the path of reflected light from the beam of light back through the sensor window towards the optical sensor. Thus, the optical interferent may cause the LIDAR sensor to generate incorrect information for the area of the sensor window.

As a result, the performance of the LIDAR sensor can be either degraded or the data generated by the LIDAR sensor (sensor data) can become completely invalid. For example, an opaque optical interferent on the sensor window will attenuate the beam of light, blocking the function in the affected scan area. Water or other transparent liquid may not block the beam of light completely, but water may act like a lens and deflect the beam of light. Large-angle deflection has the effect of reducing the intensity of returning or reflected light, similar to the opaque optical interferent. Smaller-angle beam deflection can return incorrect data to the optical sensor, resulting in valid-looking measurements from objects in locations different than where the LIDAR sensor is actually aiming the beam of light. In some cases, the sensor data from the deflected light degraded to the point that the noise of the LIDAR sensor overwhelms the desired sensor data. Thus, the sensor data becomes useless and unusable by vehicle's computing devices, creating potentially dangerous situations.

BRIEF SUMMARY

Aspects of the disclosure provide a system for determining whether an optical interferent is located on a sensor window. The system includes a housing. The housing includes a first sensor window and a second sensor window. The first sensor window has a first external surface property for deflecting water and the second sensor window has a second external surface property for deflecting water different from the first external surface property. The system also includes a laser light source configured to generate a beam of light through at least the first sensor window, an optical sensor, and one or more processors. The one or more processors are configured to receive sensor data corresponding to light from the beam of light detected by the optical sensor identifying distances from the optical sensor to an object in an external environment of the housing and to determine that an optical interferent is located on a surface of at least one of the first sensor window and the second sensor window based on a comparison between a portion of the sensor data from the first sensor window corresponding to the object and a portion of the sensor data from the second sensor window corresponding to the object.

In one example, the first external surface property corresponds to an external surface of the first sensor window being more hydrophobic than an external surface of the second sensor window. In another example, the first external surface property corresponds to an external surface of the first sensor window being more hydrophilic than an external surface of the second sensor window. In anther example, the first external surface property corresponds to a first coating applied to the first sensor window. In this example, the second external surface property corresponds to a second coating applied to the second sensor window, wherein the first coating and the second coating have different properties for deflecting water. In addition, the first external surface property corresponds to a first material of the first sensor window. In addition or alternative, the second external surface property corresponds to a second material of the second sensor window, wherein the first material and the second material have different properties for deflecting water. In another example, the comparison includes a comparison of a first distance to an object determined from the portion of the sensor data from the first sensor window and a second distance to the object determined from the portion of the sensor data from the second sensor window. In this example, the first distance and the second distance correspond to different locations of an object detected within a predetermined period of time. In another example, the first sensor window and the second sensor window comprise different portions of a single window. In another example, the optical interferent is water.

In another example, the system also includes a vehicle and the housing is attached to the vehicle. In this example, the one or more processors are further configured to control the vehicle in an autonomous driving mode based on the comparison. In addition, the one or more processors are further configured to, when the comparison indicates that the optical interferent is located on the first sensor window, temporarily ignore the sensor data from the first sensor window when controlling the vehicle in the autonomous driving mode. In addition or alternatively, the one or more processors are further configured to, when the comparison indicates that the optical interferent is located on the second sensor window, temporarily ignore the sensor data from the second sensor window when controlling the vehicle in the autonomous driving mode.

In another example, the housing is configured to rotate such that the laser light source configured to generate a beam of light through both the first sensor window and the second sensor window at different times while the housing is rotating. In addition or alternatively, the system also includes a mirror element configured to rotate and reflect the beam of light through both the first sensor window and the second sensor window at different times while the housing is rotating. In another example, the system also includes a second laser light source configured to generate a second beam of light through the second sensor window while the laser light source generates the beam of light through the first sensor window. In this example, the second laser light source is fixed relative to the second sensor window and the laser light source is fixed relative to the first sensor window. In addition or alternatively, the housing is configured to rotate 360 degrees such that the laser light source and the second laser light source rotate with the housing.

DETAILED DESCRIPTION

Figure 1:
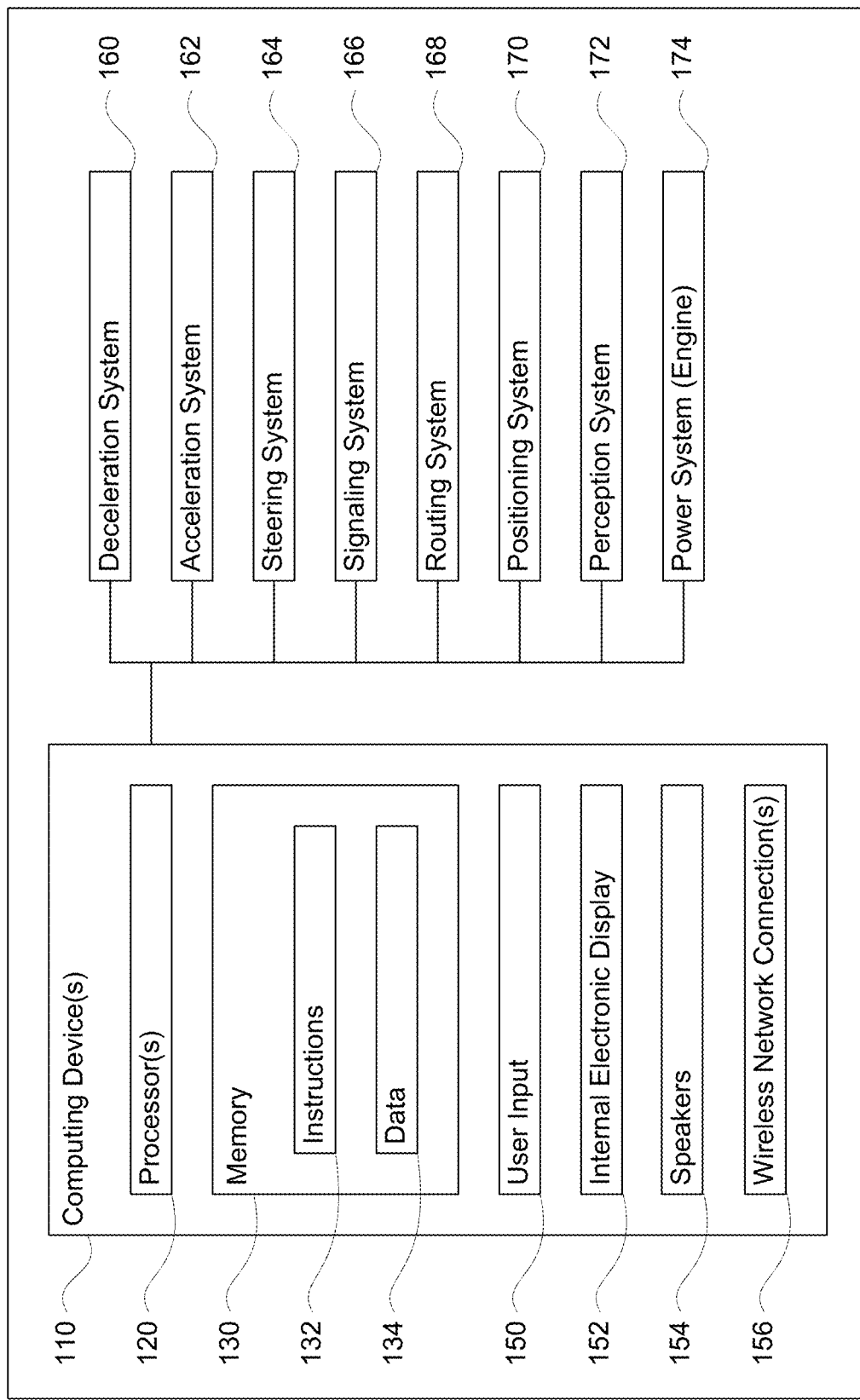
FIG. 1 is a functional diagram of an example vehicle in accordance with aspects of the disclosure according to aspects of the disclosure.

Aspects of the technology relate to determining whether a sensor window of a LIDAR sensor is contaminated with one or more optical interferents. In order to do so, the sensor windows may be configured with different surface properties. As an example, if the sensor windows are made of glass or plastic, the outer surface may have a permanent coating applied to vary the properties with respect to the behavior of optical interferents on the window. In this regard, one sensor window may have a hydrophobic coating while a different window may have a hydrophilic coating. For instance, a first of the sensor windows may have a more hydrophobic surface than a second of the sensor windows. Thus, the second of the sensor windows may have a more hydrophilic surface than the first of the sensor windows.

As the LIDAR sensor scans the environment, it may receive information through each of the sensor windows having different surface properties. For instance, two sensor windows are located at different positions on the housing. One or more lasers may direct a beam through one or both of the sensor windows. Depending on the configuration of the LIDAR sensor, eventually, laser light passing through each of the windows will return information for the same physical area, for instance, the same object.

In all conditions (whether one or more of the sensor windows has contaminants or not) it is possible to compare the corresponding data points returned from each sensor window and perform a general comparison. As noted above, each sensor window will have produced data points for a given area. Because of the different hydrophilic and hydrophobic surface properties, when the sensor windows are wet, the same object may appear to be located at different distances from the LIDAR sensor depending on the surface properties of the window through which the sensor data was generated. The distances of these points may then be compared to determine if there are at least a threshold number of points that have at least some minimum amount of change in distance.

The detection of a threshold number of differences can be used to determine that the sensor windows are wet or otherwise contaminated. In some cases, the detection of a difference can be used to determine which data (or rather data from which sensor window) to use for a particular geographic area, or select a preferred sensor window to use as the default window for the given environmental conditions. In this regard, where the threshold number of differences has been met, sensor data from the preferred sensor window may be considered reliable while sensor data from other sensor windows may be discarded or temporarily ignored until conditions for the other sensor windows improve.

In addition, the intensity of the rain or precipitation may be relevant to determining which sensor window is providing the best or rather the most reliable, data given the current environmental condition for the LIDAR sensor. As an example, the sensor window with hydrophobic surface properties may provide better data when there is only light rain because the more water there is on the hydrophobic surface, the greater the lens effect. At the same time, the sensor window with hydrophilic surface properties may provide better data in very heavy rain as there is less of a distortion of the light.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle in order to maneuver vehicle 100 in a fully autonomous driving mode and/or semi-autonomous driving mode. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (for instance, a gasoline or diesel powered motor or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type, direction and speed of movement, etc. The raw data from the sensors and/or the aforementioned characteristics can be quantified or arranged into a descriptive function or vector and sent for further processing to the computing devices 110. As discussed in further detail below, computing devices 110 may use the positioning system 170 to determine the vehicle's location and perception system 172 to detect and respond to objects when needed to reach the location safely.

Figure 2:
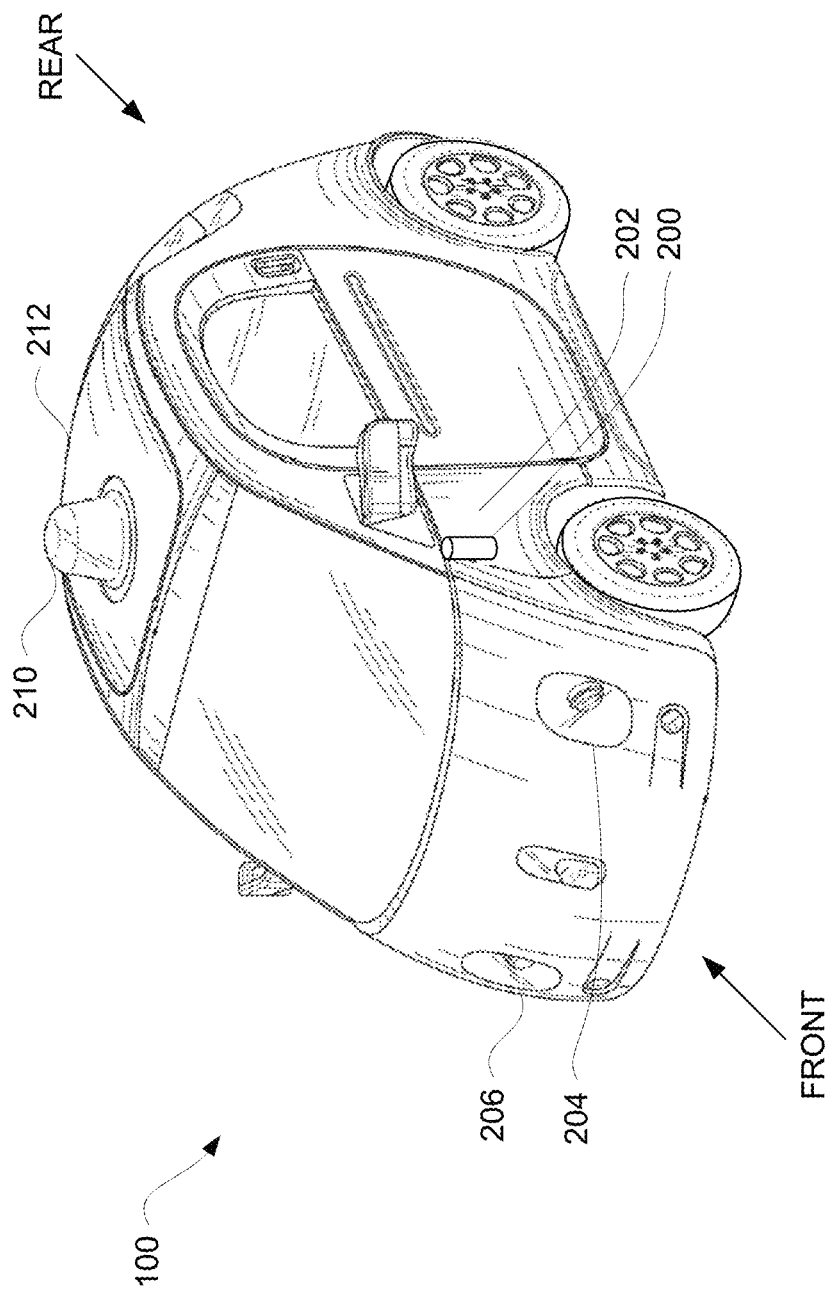
FIG. 2 is an example external view of the example vehicle of FIG. 1 in accordance with aspects of the disclosure.

FIG. 2 is an example external view of a vehicle 100. As indicated above, the perception system 172 may include one or more sensors, such as LIDAR sensor 200 and LIDAR sensor 210. LIDAR sensor 200 is located on a "driver" side (left-side from rear perspective of vehicle 100) front panel 202 adjacent to a headlamp 204. A corresponding LIDAR sensor 200 may also be mounted on a "passenger" side (right-side from rear perspective of vehicle 100) front panel adjacent to headlamp 206 (though not visible from the perspective of FIG. 2). This placement allows the LIDAR sensors 200 to capture a 180 degree portion of the environment of the vehicle from the driver side (or passenger side) panel.

LIDAR sensor 210 is located on a roof panel 212 of the vehicle. This positioning allows LIDAR sensor 210 to capture a 360 degree view of the vehicle's environment from above the vehicle, but of course, there are areas below the roof panel which may escape the field of view of LIDAR sensor 210.

Figure 3B:
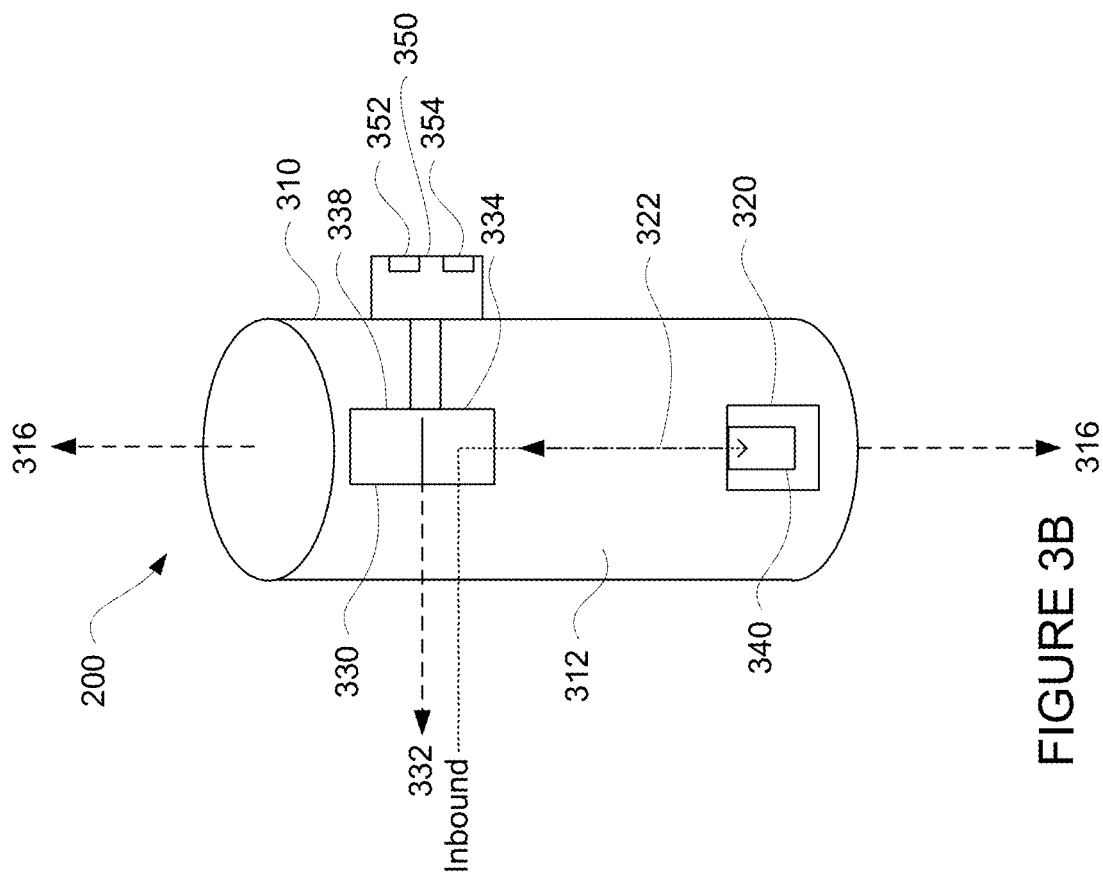
FIGS. 3A and 3B are views of an example LIDAR sensor in accordance with aspects of the disclosure.
Figure 3A:
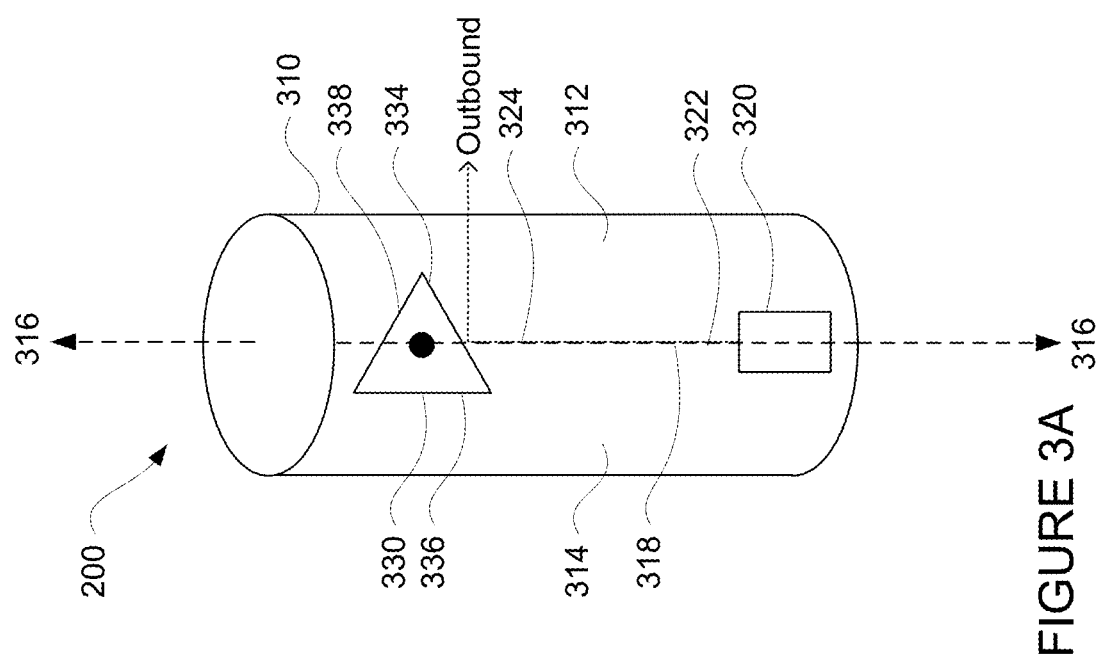

FIGS. 3A and 3B are an example configuration of the LIDAR sensor 200. In the example of FIG. 3B, LIDAR sensor 200 is shown rotated 90 degrees clockwise about a first axis 316 from the position of LIDAR sensor 200 as shown in FIG. 3A. In this example, the LIDAR sensor 200 includes a housing 310 having a first sensor window 312 and a second sensor window 314. The housing 310 is configured to rotate about a first axis 316, thereby rotating the first sensor window 312 and second sensor window 314. In this regard, the housing 310 may be attached to a small electric motor connected to a controller 350 discussed further below.

Within the housing is a laser light source 320, a mirror element 330, and an optical sensor 340. The laser light source 320 may be configured to emit a beam of light along a second axis 322, parallel to (or in line with) the first axis. For instance, the laser light source 320 could be a semiconductor waveguide laser, a fiber laser, an excimer laser, or another type of laser system that produces a beam of light 324 (partially overlapping with reference line 318) corresponding to a beam of consistent pulsed light. The emission wavelength of the laser light source 320 may be in the infrared (IR) wavelength spectrum, the visible wavelength spectrum or the ultraviolet (UV) wavelength spectrum. The beam of light 324 is an outbound mean of light. The outbound beam and the inbound light beam (shown in FIG. 3B) may be collinear with the first axis 316 with a mirror or other device (not shown) connecting the beams to the laser light source 320 and the optical sensor 340, located to the side of the device.

The mirror element 330 may be configured to rotate about a third axis 332. As shown, the first axis and the third axis may be perpendicular with respect to one another, and thus, the third and second axes may be perpendicular with respect to one another. In addition, the mirror includes 3 reflective surfaces 334, 336, 338 which form a triangular shape. The reflective surfaces may be configured to reflect light at, or substantially at, the emission wavelength of the laser light source 320. In this regard, the reflective surfaces may be formed from, and/or coated with, a metal, such as aluminum, gold, silver, or another reflective material. Additionally or alternatively, the reflective surfaces may include a high reflectance (HR) coating. In an example embodiment, the HR coating may include a dielectric stack configured to reflect incident light at the emission wavelength. The dielectric stack may include, for example, a periodic layer system alternating between two materials having different indices of refraction. Other types of HR coatings are possible and contemplated herein.

The optical sensor 340 may be configured to receive light from the environment around the LIDAR sensor 200 via an optical element (for example, a condenser lens). Based on the received light, the optical receiver may provide information about a scene of the environment around the LIDAR sensor 200. The optical receiver may include a detector array including a plurality of single photon avalanche detectors (SPADs) and or other types of photodetectors configured to detect light.

The controller 350 may include one or more processors 352 and memory 354, configured similarly to processors 120 and memory 130. The processors 352 are configured to execute instructions stored in the memory so as to control the position of the laser, control the emission of a beam of light from the laser, control rotation of mirror and housing 310 using one or more electric motors (not shown), and process data received from the sensor array. For instance, the mirror element 330 may rotate about the third axis 332 at a rotational frequency of about 500 kHz, or more or less, while the housing 310 may rotate about the first axis 316 at a rotational frequency of about 10 Hz, or more or less or the housing 310 may rotate at 600 rpm or more or less while the mirror element may rotate at 30,000 rpm or more or less.

Although not shown, optical system may also include at least one beam stop formed from a polymer, metal, fabric, or other materials and configured to prevent laser light from being emitted into the environment at angles outside an emission angle range. In an example embodiment, the emission angle range may be greater than 230 degrees about the second axis.

As discussed above, the mirror element 330 and the housing 310 rotate in different axes in order to reflect a beam of light generated by the laser through the first sensor window 312 and the second sensor window 314. As the mirror element 330 rotates, the beam may be scanned from top to bottom or bottom to top through the first sensor window 312 and the second sensor window 314. The result for a 360 degree rotation of the housing are stripes of data points (half through one window and half through the other) representing distances of objects. Because both the housing (i.e. the sensor windows) and the mirror element are rotating in different axes, data points for the same object will be reflected through each of the first sensor window 312 and the second sensor window 314 multiple times in a very brief period of time.

As shown in FIG. 3A, the first and second sensor windows 312, 314 are divided by reference line 318 (and thus only the first sensor window is visible in FIG. 3B) each cover a 180 degree portion of the housing 310, though each window may cover more or less of the housing 310. In addition, the first sensor window 312 and the second sensor window 314 may have different surface properties. For example, the first sensor window 312 may have surface properties that make the first sensor window 312 more hydrophobic than the second sensor window 314. Similarly, the second sensor window 314 may have surface properties that make the second sensor window 314 more hydrophilic than the first sensor window 312.

In dry conditions, both hydrophilic and hydrophobic surfaces may behave similarly, allowing dry optical interferents (dust, dirt, salt, leaves, etc.) to move off of the sensor windows in essentially the same way with some dry optical interferents adhering or clearing differently on the different surfaces depending on their specific material properties and the interaction with each surface. During wet conditions, such as where there is water or liquid in the form of rain, fog, snow, or other precipitation on the sensor windows, the different surface properties cause the sensor windows to behave much differently, with possibly more transient sensing issues in the hydrophilic window.

In wet conditions, the hydrophobic and hydrophilic surfaces will both clear the window but in different ways. A hydrophobic surface has the effect of causing the water to bead up and roll off the surface downhill In other words, the hydrophobic coating may allow small beads of water to sit on the surface of the sensor window until these beads are knocked free or accumulating droplets coalesce into drops heavy enough to roll down the surface. While on the surface, each bead acts as a lens and refocuses some of the light. This causes a dispersion of the light passing through the region of the bead and will affect the LIDAR sensor 200's performance, mostly by degrading the light intensity returned to the optical sensor. The deflection from the beam of light generated by the laser light source 320 is minimal A hydrophilic surface will promote the formation of a water film on the surface which will flow downhill. The hydrophilic surface also allows water to lift and remove certain dry contaminants with ease, such as permanent marker. Thus, a hydrophilic surface is superior for clearing debris from the window but causes accumulating water to flow down the window as a variable-thickness film. However, the water film has shallow-angle leading and trailing edges, and supports traveling waves resulting from drops impacting the film. Because of this, the shallow angles can deflect the beam of light generated by the laser light source 320 to angles that create significant measurement errors. In other words, the light becomes distorted and makes it appear as if the data has come from a different place. In addition, the water can also disperse the beam of light as it passes through the water, reducing return intensity. The controller 350 of the LIDAR sensor 200 may not be able to distinguish this bad data from good data, causing problems with both the sensor data processing and confidence in that sensor data.

Figures 4A, 4B:
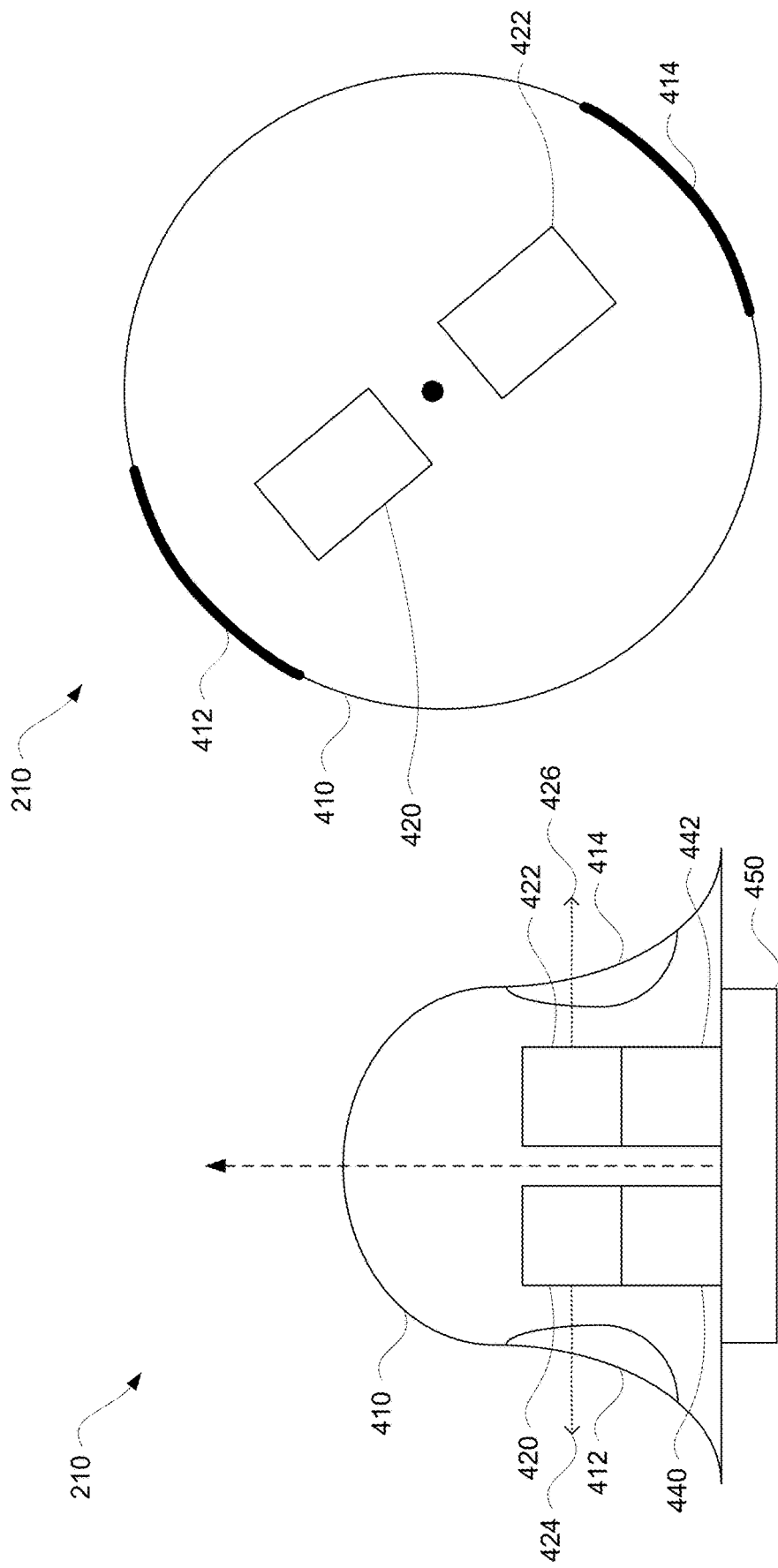
FIGS. 4A and 4B are views of another example LIDAR sensor in accordance with aspects of the disclosure.

FIGS. 4A and 4B are an example configuration of a LIDAR sensor 210. FIG. 4A is a side view and FIG. 4B is a top down view. In this example, the LIDAR sensor 210 may include a housing 410 having a first sensor window 412 and a second sensor window 414, laser light sources 420, 422 which may be configured similarly to laser light source 320, an optical sensor 440, 442 configured similarly to optical sensor 340, and a controller 450 configured similarly to controller 350.

In this example, the laser light sources 420, 422, are arranged "back to back" or rather approximately 180 degrees from one another or less within the housing 310. In this regard, the laser light sources may produce beams of light 424, 426 spaced at approximately 180 degrees from one another. Each laser may be fixed relative to one another as well as a respective one of the first and second sensor windows 312, 314. Thus, this example, the laser light sources 420, 422 and the first and second sensor windows 412, 414 may rotate together, for instance at 600 rpm or more or less. In this regard, data points for the same area of the environment of LIDAR sensor 210 will be reflected through each of the first and second sensor windows at least once during a single revolution of the laser light sources.

As with the example of LIDAR sensor 200, in the example of LIDAR sensor 210, the first and second sensor windows 412, 414 may have different surface properties. For example, the first sensor window 412 may have surface properties that make the first sensor window 412 more hydrophobic than the second sensor window 414. Similarly, the second sensor window 414 may have surface properties that make the second sensor window 414 more hydrophilic than the first sensor window 412.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Referring to LIDAR sensor 200, in order to produce sensor data for processing by the computing devices 110, controller 350 may control the functioning of the LIDAR sensor 200. As noted above, the controller 350 may cause the laser light source 320 to generate a beam of light 324 in the direction of the mirror element 330. The controller 350 also causes the mirror element 330 and the housing to rotate. As the mirror element 330 rotates, light from the beam of light is reflected off of the sides of the mirror element 330. The result causes the beam of light to pass through the housing 310 in a series of stripes of light, each stripe corresponding to light reflected from one of the sides. This reflected or "outbound" light (see FIG. 3A) then passes through the first sensor window 312 or the second sensor window 314 depending upon the position of the housing 310 during the rotation of the housing 310.

The outbound light then hits an object in the environment of the LIDAR sensor 200 and is reflected back towards the first sensor window 312 or the second sensor window 314 as "inbound light" (see FIG. 3B), again, depending upon the position of the housing 310 during the rotation of the housing 310. The inbound light is then again reflected by the same surface of the mirror element 330 and towards the optical sensor 340 (and being directed to the optical sensor 340 via a mirror or other device if needed). Eventually, inbound and/or outbound light from the beam of light passing through each of the first and second sensor windows 312, 314 will be reflected by the object.

Once light is received at the optical sensor 340 (or 440), the controller 350 (or 450) then uses the timing differences between when the beam of light was generated by the laser light source 320 and when the light reached the optical sensor 340 to determine the distance between the object and the optical sensor. The controller 350 (or 450) may provide this information as sensor data including a plurality of data points corresponding to the direction and distances of different objects in the environment to the computing devices 110 for further processing.

In all conditions or when whether a surface of one or more of the sensor windows 312 and 314 or 412 and 414 has an optical interferent on the surface or not, it is possible for the computing devices 110 to perform a general comparison of corresponding data points returned from each of the first and second sensor windows 312 and 314 or 412 and 414. For instance, in the example of LIDAR sensor 200, after a brief period of time, there will be a series of stripes of data points for each of the first sensor window 312 and the second sensor window 314. In addition, each of the first and second sensor windows 312, 314 will have produced data points for a given area or rather a given direction from the LIDAR sensor 200. Thus, the distances of the data points for the area generated by inbound or outbound light passing through the first sensor window 312 may be compared to the distances of the data points for the area generated by inbound our outbound light passing through the second sensor window 314.

In the example of LIDAR sensor 210, after a single 360 degree rotation of the housing 410, there will be data points for each of the first sensor window and the second sensor window 414 for the entire 360 degree area around the LIDAR sensor. Thus, the distances of the data points for the 360 degree area generated by inbound or outbound light passing through the first sensor window 412 may be compared to the distances of the data points for the 360 degree area generated by inbound our outbound light passing through the second sensor window 414. Alternatively, to save time on processing, a smaller area, corresponding to a 1, 5, or 10 degrees or more or less of overlapping data points may be compared.

The comparison may be used to identify whether there are at least a threshold number of distances of the data points that have at least some minimum amount of change in distance. Essentially, the computing devices 110 may determine if the LIDAR sensor 200 (or alternatively LIDAR sensor 210) is observing the same object at different distances at nearly the same time. In other words, small changes, such as those on the order of several inches or more or less, in the locations of an object may be expected due to inaccuracies in the processing at the controller 350 (or alternatively controller 450), movement of the object, movement of the LIDAR sensor etc. However, larger changes, such as on the order of several feet or more or less, over the course of very small periods of time, such as a fraction of a second or more or less, may indicate that there is an optical interferent on a surface of one of the sensor windows.

In other words, an optical interferent located on a surface of a sensor window, such as any of sensor windows 312, 314, 412, 414, can be identified as a difference in the comparable sensor data points from the different surface properties of the different sensor windows. Thus, the detection of differences can be used to determine that an optical interferent is on a surface of a sensor window, and thus, can be an indication that there is water or debris on the sensor window.

In some cases, the detection of a difference can be used to determine which sensor to use for a particular area of or select a preferred sensor window to use as the default window for the given environmental conditions. This may also involve comparison with sensor data generated for the area at a previous time, for instance immediately before the current sensor data was generated, and can even increase the accuracy of the comparison and provide greater confidence in the determination that there is an optical interferent on a surface of a particular sensor window.

For instance, when the comparison of the current sensor data for an area generated by inbound or outbound light passing each of the different sensor windows indicates that there is an optical interferent on a surface of one of the sensor windows, the current sensor data for one or both of the first and second sensor windows may be compared with previous sensor data. In this regard, if the previous sensor data for the area (generated by inbound or outbound light passing either or both of the first or second sensor window) "agrees with" the current sensor data for the area generated by inbound or outbound light passing through the first sensor window, this may indicate that there is an optical interferent on a surface of the second sensor window which did not exist at the time the previous sensor data was generated. Similarly, if the previous sensor data "agrees with" the current sensor data for the area (generated by inbound or outbound light passing either or both of the first or second sensor window) generated by inbound or outbound light passing through the second sensor window, this may indicate that there is an optical interferent on a surface of the second sensor window that did not exist at the time the previous sensor data was generated. As an example, the current and previous sensor data may agree when the differences in the distances of the data points for the current sensor data and the previous sensor data (after accounting for possible movement of the LIDAR sensor, for instance, if located on a moving vehicle such as vehicle 100) do not meet the threshold number of distances.

The comparison may include comparing the round-trip time of flight of light form the beam of light from the last light source to the optical sensor. For instance, when the system is aiming at a particular azimuth A and altitude B, if the time-of flight indicates that there is a reflective object at AB at a distance of X through one of the sensor windows, the computing devices would expect that the distance measured at the same AB through another of the sensor windows to be the same, assuming that the point in space where the LIDAR is pointing is substantially the same. If one of the sensor windows has interferent that blocks the outbound beam of light, the time of flight will indicate a very small distance or will indicate an error. If one window has interferent that deflects the inbound beam of light, the time of flight will indicate the distance to some other object at a different distance X (or the beam of light may never return). In another example, if the distance reading from one of the sensor windows has not changed over the last few readings while the other has, it is likely that the other sensor window is reporting erroneous data.

Comparing to the previous sensor data generated by inbound or outbound light passing through the first and second sensor windows may further increase the accuracy of the determination of whether the optical interferent is located on the first or second sensor window. This may be especially useful in identifying anomalies, or for instance, optical interferents on the surface of a sensor window that were only on the surface for a very brief period of time. In addition, differences that persist for several scan cycles can be used as an indication of the need to clean one or more of the sensor windows.

In addition, when the optical interferent is water, the intensity of the rain or precipitation may be relevant to determining which of the sensor windows on the housing 310 or 410 is providing the best data. As an example, a sensor window, such as first sensor window 312 or 412, having hydrophobic surface properties may provide better data when there is only light rain because the more water there is on the hydrophobic surface, the greater the lens effect on the inbound or outbound light. At the same time, a sensor window, such as second sensor window 314 or 414, having hydrophilic surface properties may provide better data in very heavy rain as there is less of a distortion of the inbound or outbound light.

In another example LIDAR sensor, comparable to LIDAR sensor 210, rather than having two laser light sources 420, 422 fixed relative to the first sensor window 412 and the second window 414 such that the housing 410 and the laser light sources 420, 422 rotate in unison, one or more fixed laser light source may be used. In this example, the housing and first and second sensor windows may rotate around the laser light source while the laser light source produces a beam of light in a single direction or as a stripe by moving the laser light source up and down within the housing in an axis parallel or near parallel to the axis of rotation of the housing. Depending upon the speed of the rotation of the housing and the movement of the laser light source, sensor data may be generated for light passing through each of the first and second sensor windows corresponding to the same area of the environment. Within a single or very few revolutions of the housing. The distances of the data points for the area may then be compared and processed to determine if a surface of the first or second sensor window has an optical interferent and whether to ignore sensor data generated by light passing through the first or the second sensor window.

In the examples described above, the first and second sensor windows are depicted as different, discrete windows. However, the first and second sensor windows may alternatively be individual sub portions of a single sensor window.

Although the examples herein relate to two sensor windows having different surface properties, a similar comparison process may be used with three or more sensor windows. In such an example, multiple comparisons between sensor data generated by light passing through each of the sensor windows for the same area of the environment may be used. Where sensor data for an area generated from light passing through a first and second sensor window is in agreement while sensor data for the area generated from light passing through a third sensor window is not in agreement with the two or more sensor windows, this may be an indication that a surface of the third sensor window has an optical interferent.

Alternatively, the comparison may be used to identify when a surface of a sensor window has an optical interferent where the first and second sensor windows have similar or the same surface properties.

Once the computing devices 110 have determined that a surface of a particular one of the sensor windows includes an optical interferent, the computing devices may temporarily ignore the "bad" or unreliable sensor data generated by light passing through that particular one. In other words, the computing devices 110 may not use that sensor data when making driving decisions for the vehicle. Thus, the computing devices 110 can avoid using data that has been compromised by the optical interferent. This, in turn, can greatly increase the safety of the operation of the vehicle 100. In addition, the sensor data may be ignored until new sensor data is generated where the differences in the distances between data points generated by light passing through the first and second sensor windows no longer meets the threshold. By ignoring the sensor data, the computing devices 110 may avoid Alternatively, the comparison and other processing may be performed by the processors 352 of controller 350 or a combination of the processors 352 of controller 350 and the one or more computing devices 110. In one instance, when the controller 350 has determined that an optical interferent is on a surface of one of the sensor windows, the controller 350 need not actually send sensor data generated by light passing through that sensor window to the computing devices 110 of the vehicle 100. In this way, the "bad" sensor data is not used by the computing devices 110 when making driving decisions for the vehicle, for instance, until sensor data generated from light passing through the first and second sensor windows is again in agreement.

Figure 5:
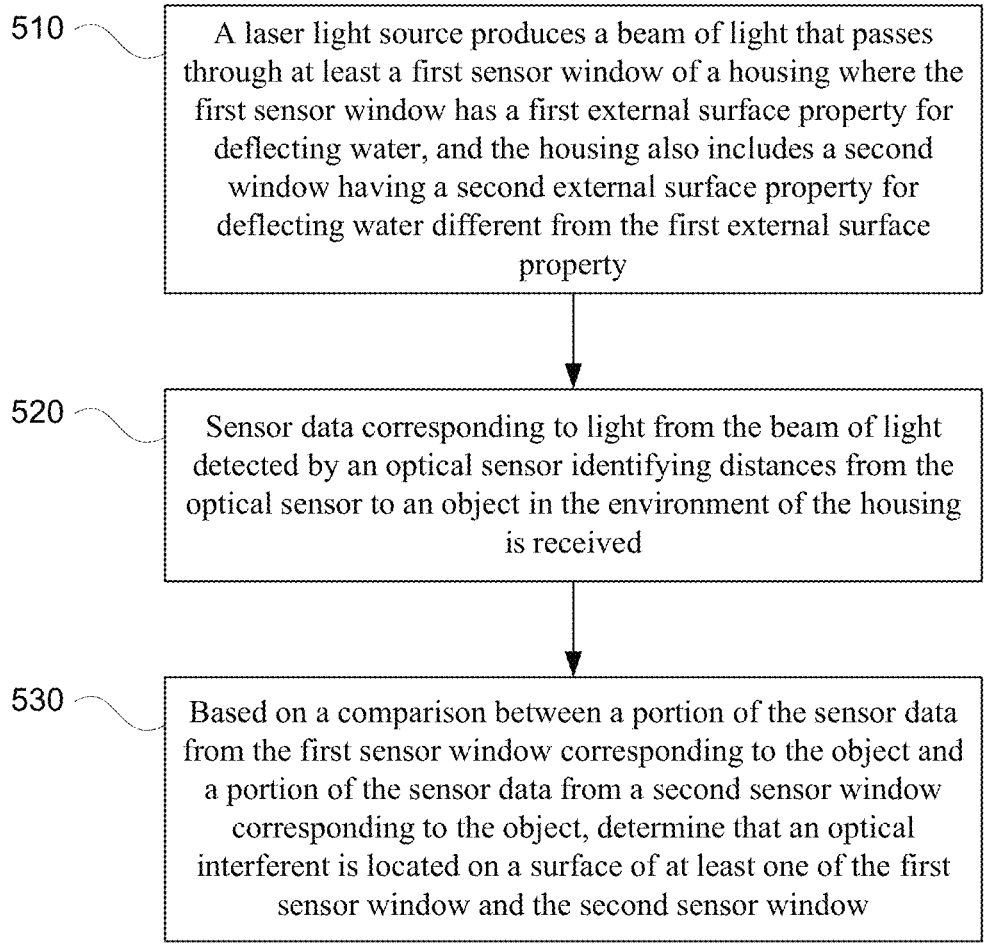
FIG. 5 is an example flow diagram in accordance with aspects of the disclosure.

FIG. 5 is an example flow diagram 500 in accordance with some of the aspects described. In this example, a laser light source produces a beam of light that passes through at least a first sensor window of a housing where the first sensor window has a first external surface property for deflecting water at block 510. The housing also includes a second window having a second external surface property for deflecting water different from the first external surface property. Sensor data corresponding to light from the beam of light detected by an optical sensor identifying distances from the optical sensor to an object in the environment of the housing is received at block 520. Based on a comparison between a portion of the sensor data from the first sensor window and a portion of the sensor data from a second sensor window corresponding to the object determine that an optical interferent is located on a surface of at least one of the first sensor window and the second sensor window corresponding to the object at block 530.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling a vehicle in an autonomous driving mode, the method comprising:
receiving, by one or more processors, sensor data generated by a sensor and identifying distances from the sensor to an object in an external environment of the sensor, the sensor having a housing including a first sensor window and a second sensor window, the first sensor window having a first external surface property and the second sensor window having a second external surface property different from the first external surface property;
determining, by the one or more processors, that a surface of the first sensor window includes an optical interferant based on a comparison between a first portion of the sensor data from the first sensor window corresponding to the object and a second portion of the sensor data from the second sensor window corresponding to the object; and
when the comparison indicates that the surface of the first sensor window includes the optical interferant, controlling, by the one or more processors, the vehicle in an autonomous driving mode based on the comparison.

2. The method of claim 1, wherein the first external surface property corresponds to an external surface of the first sensor window being more hydrophobic than an external surface of the second sensor window.

3. The method of claim 1, wherein the first external surface property corresponds to an external surface of the first sensor window being more hydrophilic than an external surface of the second sensor window.

4. The method of claim 1, wherein the first external surface property corresponds to a first coating applied to the first sensor window.

5. The method of claim 4, wherein the second external surface property corresponds to a second coating applied to the second sensor window, wherein the first coating and the second coating have different properties for deflecting water.

6. The method of claim 5, wherein the first external surface property corresponds to a first material of the first sensor window.

7. The method of claim 6, wherein the second external surface property corresponds to a second material of the second sensor window, wherein the first material and the second material have different properties for deflecting water.

8. The method of claim 1, wherein the comparison includes a comparison of a first distance to an object determined from the first portion of the sensor data from the first sensor window and a second distance to the object determined from the second portion of the sensor data from the second sensor window.

9. The method of claim 8, wherein the first distance and the second distance correspond to different locations of an object detected within a predetermined period of time.

10. The method of claim 1, wherein the first sensor window and the second sensor window comprise different portions of a single window.

11. The method of claim 1, wherein the optical interferent is water.

12. The method of claim 1, wherein the housing is attached to the vehicle.

13. The method of claim 1, wherein the sensor includes a semiconductor waveguide laser, a fiber laser or an excimer laser.

14. The method of claim 1, further comprising, when the comparison indicates that the first sensor window includes the optical interferant, temporarily ignoring sensor data generated via the first sensor window when controlling the vehicle in the autonomous driving mode.

15. The method of claim 1, further comprising, determining when sensor data generated via the first sensor window should no longer be ignored when controlling the vehicle in the autonomous driving mode.

16. The method of claim 1, further comprising, generating, using the sensor, the sensor data including the first portion and the second portion.

17. The method of claim 16, wherein the housing is configured to rotate such that the sensor is configured to generate a beam of light through both the first sensor window and the second sensor window at different times while the housing is rotating in order to generate the first portion and the second portion.

18. The method of claim 17, further comprising a mirror element configured to rotate and reflect the beam of light through both the first sensor window and the second sensor window at different times while the housing is rotating to generate the first portion and the second portion.

19. The method of claim 16, wherein the sensor includes a first laser and a second laser, the first laser being configured to generate a beam of light through the second sensor window while the second laser generates a beam of light through the first sensor window, and generating the sensor data includes using the first laser and the second laser.

20. The method of claim 19, wherein the second laser is fixed relative to the second sensor window and the first laser is fixed relative to the first sensor window, and the method further comprises rotating the second laser and the first laser with the housing in order to generate the sensor data.

* * * * *